US006068158A

United States Patent [19]

Chabout

[11] Patent Number: 6,068,158

[45] Date of Patent: May 30, 2000

[54] PILL DISTRIBUTOR

[76] Inventor: Jean-Michel Chabout, 27, Boulevard Gambetta, 38000 Grenoble, France

[21] Appl. No.: 09/129,576

[22] Filed: Aug. 5, 1998

[51] Int. Cl.[7] .......... B65G 59/00

[52] U.S. Cl. .......... 221/113; 221/90; 221/91

[58] Field of Search .......... 221/93, 97, 98, 221/105, 113, 122, 154, 187, 189, 283, 306, 90, 91

[56] References Cited

U.S. PATENT DOCUMENTS

| | | | |
|---|---|---|---|
| 4,109,825 | 8/1978 | Weitzman | 221/122 X |
| 4,621,746 | 11/1986 | Reichle et al. | 221/91 X |
| 4,838,453 | 6/1989 | Luckstead | 221/86 X |
| 5,322,166 | 6/1994 | Crowther | 221/90 X |
| 5,441,165 | 8/1995 | Kemp et al. | 221/97 X |
| 5,460,294 | 10/1995 | Williams | 221/90 X |
| 5,477,981 | 12/1995 | Heyl et al. | 221/86 |
| 5,605,249 | 2/1997 | Gonyea | 221/97 X |
| 5,730,316 | 3/1998 | Falk | 221/122 |

*Primary Examiner*—Christopher P. Ellis
*Assistant Examiner*—Gene O. Crawford
*Attorney, Agent, or Firm*—Arthur L. Plevy; Buchanan Ingersoll PC

[57] ABSTRACT

An automatic medication distributor including a hopper of general cylindrical shape, having boxes open transversally near the periphery of the hopper; a fixed base adapted to be associated to the hopper and provided, transversally and at a predetermined location of its periphery, with a delivery window; rotation drive mechanism of the hopper with respect to the base to successively bring each box in register with the delivery window; and a closing element for the delivery window, operated by the rotation of the hopper.

14 Claims, 7 Drawing Sheets

PILL DISTRIBUTOR

FIELD OF THE INVENTION

The present invention relates to an automatic distributor for medication in the form of pills, capsules or other, designed to deliver, at predetermined times, one or several pills previously introduced into the distributor.

DISCUSSION OF THE RELATED ART

Such a distributor essentially includes a fixed base on which is mounted a rotating medication hopper or cartridge. The hopper is generally comprised of a cylindrical element in the volume of which, near the periphery, are provided open boxes for storing medication doses to deliver. The base comprises, at its upper surface facing the hopper, a window having a size substantially corresponding to the size of the opening of a box of the hopper and communicating through a funnel with a medication delivery opening, generally located in a lateral surface of the base. The hopper is rotated regularly with respect to the base so that all the boxes of the hopper successively pass before the window of the base to deliver the medication they contain. The hopper is loaded from its top by introducing in each box the medication to deliver at the corresponding time.

Such medication distributors are generally used at home by patients whose treatment permanently requires the intake of medication at regular intervals. Most often, they are weekly distributors whose hopper contains 20 boxes representing medication intakes for the morning, afternoon, and evening for each day of the week. These distributors are most often associated with an audible alarm device triggered at each delivery of medication by the distributor.

Automatic medication distributors of this type are described, for example, in documents, FR-A-2 718 636 and U.S. Pat. No. 4,674,651.

A drawback of these conventional distributors is that they are liable to mix successive delivered medication doses. Indeed, the regular rotation of the hopper causes, between each programmed intake time, two boxes to be at the same time partially over the window of the base. As a result, pills (in particular of small size) corresponding to the next dose are likely to be mixed with those of the current dose if the patient is slightly late in his intake.

Another drawback of these conventional distributors is that a given hopper, i.e. comprising a given number of boxes, is dedicated to a particular base. In the above cited documents, the hopper is associated with hourly programmable means accessible by the user, which cooperate with the base for triggering the audible alarm signal at each programmed intake. Apart from the fact that the hopper and the base are made more complex, it is necessary to manufacture, for each type of hopper (monthly, weekly, daily, or other) a dedicated base.

In document U.S. Pat. No. 4,674,651, the whole hopper is covered by an articulated cover which is lifted when loading the distributor. Once the cover is in open position, access is given to each box individually through a window arranged in a plate extending over the hopper and which is fixed to the base. This window has the size of a box and each box is successively brought at its level for introducing the corresponding dose. To prevent the medication from falling into the delivery funnel during filling, the opening of the cover causes the closing of an articulated trap over the window of the base communicating with the funnel. This trap is controlled by a lever mechanism and its opening is caused by the closing of the cover, so that the trap stays open during the whole medication delivery cycle (for example weekly).

To prevent a medication dose to be delivered before the programmed intake time, a first solution consists in rotating the hopper stepwise, instead of regularly, at each new intake time. However, such a solution would make the drive system of the distributor much more complex with respect to a regular rotation drive system.

Document U.S. Pat. No. 4,573,606 describes an other type of medication distributor in which the cylindrical element constituting the hopper is maintained vertically, i.e. the axis of the cylinder is horizontal and not vertical like in the previously described distributors. The hopper defines boxes which are open at the periphery for delivery and at the front for filling. Although it avoids a too early delivery of the medication, such a vertical arrangement of the distributor is little practical, especially for filling through the front of the hopper.

The base disclosed by document U.S. Pat. No. 4,573,606 comprises a cylindrical crown for receiving the hopper, provided with, at its bottom periphery, an opening constituting a delivery window. The delivery window is associated with a closing trap controlled by the rotation of a bottom plate associated with the hopper and provided with triggering notches When the trap opens, the medication falls in a removable goblet placed under the trap. The presence of the goblet increases the size, especially in height, of the distributor. Moreover, an additional space is necessary above the goblet to allow the operation of a medication delivery detector disclosed in this document.

SUMMARY OF THE INVENTION

An object of the invention is to provide a new distributor for medication such as pills, capsules, or the like, which is of particularly simple structure and handling.

Another object of the invention is to provide a medication distributor in which, at least for manufacture, the base may be independent of the medication intake periodicity defined by the hopper.

Another problem encountered is related to the necessary energy for operating the distributor, which is often incompatible with a battery powering. In particular, the distributor disclosed by document U.S. Pat. No. 4,573,606 has an important power consumption due, not only to its detection system, but also to the rotation energy necessary for operating the cam of the closing trap. Indeed, the trap opens by gravity when the cam allows this. The rotating energy must then be sufficient for lifting the trap through the action of the cam.

An object of the present invention is thus also to provide a distributor in which the security involved in the delivery is not achieved at the detriment of the power consumption. In particular, the invention provides a distributor in which the operation of a closing trap for a delivery window only requires very little power.

To achieve these objects, the present invention provides an automatic medication distributor comprising a hopper of general cylindrical shape, having boxes open transversally near the periphery of the hopper; a fixed base adapted to be associated to the hopper and provided, transversally and at a predetermined location of its periphery, with a delivery window; rotation drive means of the hopper with respect to the base to successively bring each box in register with the delivery window; and a closing element for the delivery window, operated by the rotation of the hopper.

According to an embodiment of the invention, the closing element is associated to a rotation axis housed in the base, and comprises a first plate constituting a trap adapted to close the delivery window and a second plate approximately perpendicular to the first, the axis being placed at the intersection of the two plates.

According to an embodiment of the invention, the actuating of the closing element is caused at predetermined positions of the hopper with respect to the base, the element being operated by a cam adapted to cooperate with notches of the bottom face of the hopper.

According to an embodiment of the invention, said plates are sized so that the closing element is in an unstable rotation rest position when cam is in a notch.

According to an embodiment of the invention, the plates are sized so that a weight in the order of 0.3 g is sufficient to cause the tripping of the first plate towards an opening position.

According to an embodiment of the invention, the hopper is associated with a cover provided with several covering elements for the boxes, each element being associated to at least one box and being connected through a hinge to a central portion of the cover.

According to an embodiment of the invention, the hopper comprises two concentric crowns connected together by walls defining the boxes, a first crown of a smaller diameter having a polygonal shape.

According to an embodiment of the invention, the number of sides of the polygon defining the first crown of the hopper corresponds to the number of covering elements of the cover.

According to an embodiment of the invention, the base contains a motor for rotating a transmission element associated to the base, the transmission element being adapted to be rotation linked to a drive element of the hopper, housed in the hopper.

According to an embodiment of the invention, the distributor is comprised of elements which are pilable and axially assembled through a straight element.

The foregoing and other objects, features, aspects and advantages of the invention will become apparent from the following detailed description of embodiments, given by way of illustration and not of limitation with reference to the accompanying drawings.

DESCRIPTION OF THE PREFERRED EMBODIMENTS

For sake of clarity, the drawings are not to scale and same elements are designated by same references in the different figures.

Figure 1:
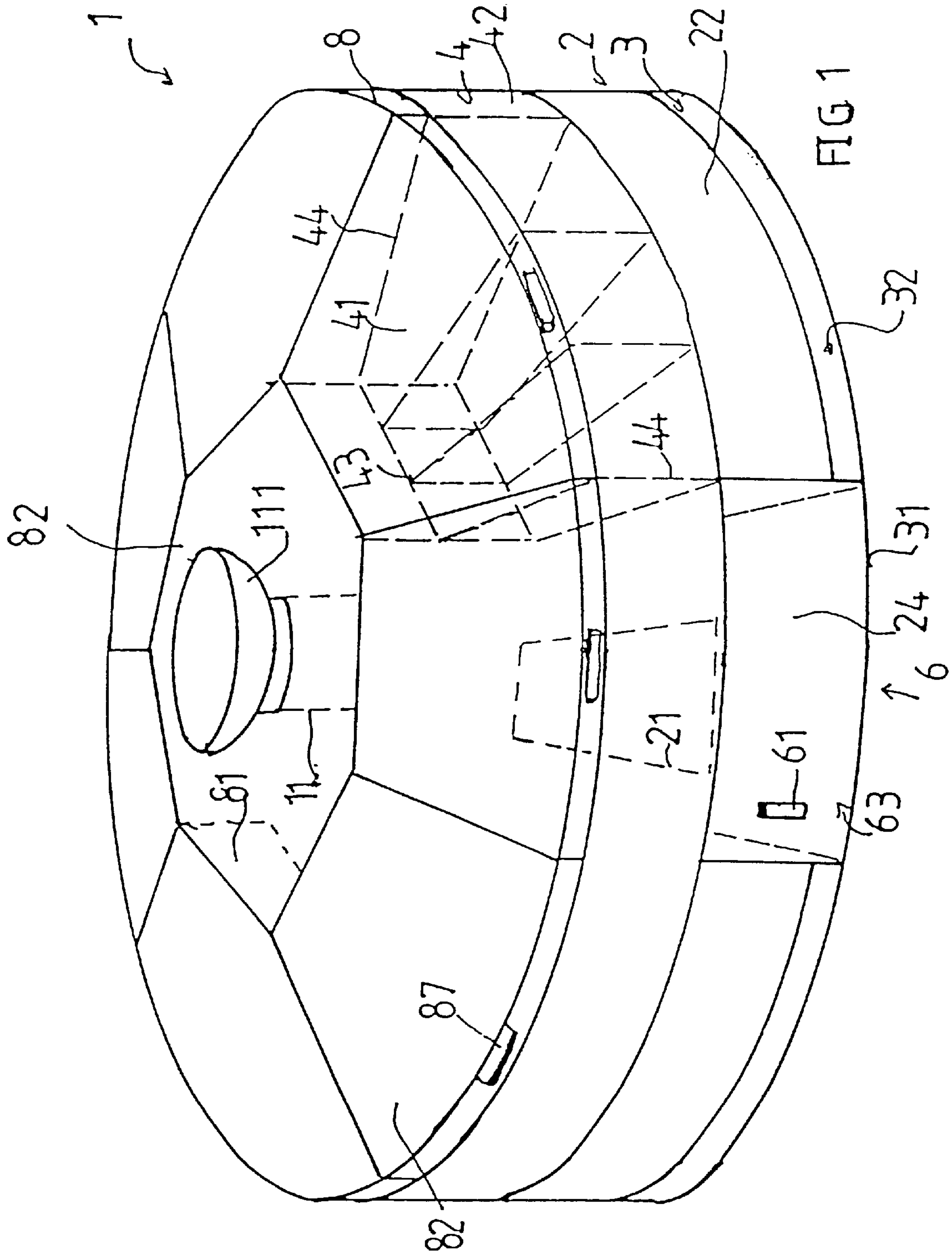
FIG. 1 shows, in perspective view and very schematically, an embodiment of a medication distributor according to the present invention.

FIG. 1 shows, in perspective view and very schematically, an embodiment of a distributor for medication in the form of pills, capsules or similar, according to the present invention. The distributor 1 is essentially comprised of a base 2 integral with a seat 3 and on which is pivotally mounted a hopper 4 having a cover 8.

Hopper 4 is conventionally comprised of a cylindrical element within which boxes 41 are arranged for storing medication doses corresponding to each intake. These boxes 41 are open at the top and the bottom of the cylindrical element for allowing a refilling of hopper 4 from its top and the delivery of medication from its bottom when a given box comes in register with a window 21 of base 2. In register with this window 21, base 2 and seat 3 define a chamber 24 for delivering medication, open laterally. A door 6, provided with a handle 61 and mounted on a hinge (62, FIG. 2A) of base 2 covers an access opening 63 to chamber 24 from outside the distributor.

Figure 11:
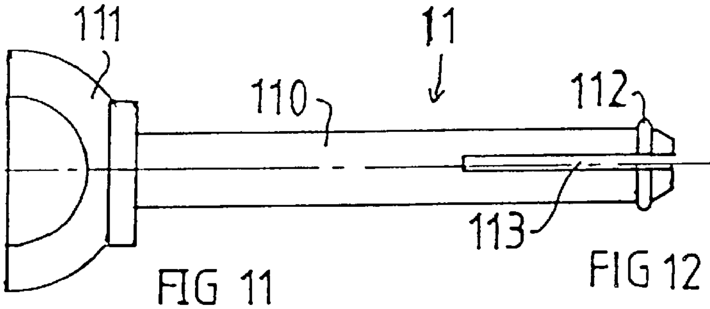
FIGS. 11 and 12 schematically show an embodiment of an assembly member of a medication distributor according to the present invention.
Figure 12:
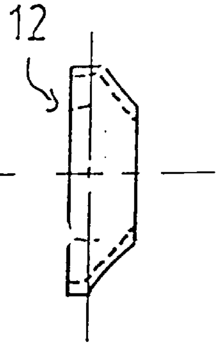

The piled assembly of seat 3, hopper 4 and cover 8 is held through a mounting member 11 which will be described in relation with FIGS. 11 and 12.

In the shown embodiment, the distributor has, seen from the top, a general circular shape. It will be however noted that other shapes may be contemplated, provided that they are adapted to a rotation about an approximately vertical axis of hopper 4 with respect to base 2 associated to seat 3. For example, seat 3 and base 2 may have, seen from the top, a general square shape on which are mounted hopper 4 and cover 8 of general circular shape.

The present invention will be described hereinafter by referring to figures each showing individual elements constituting the distributor shown in FIG. 1.

Figure 2A:
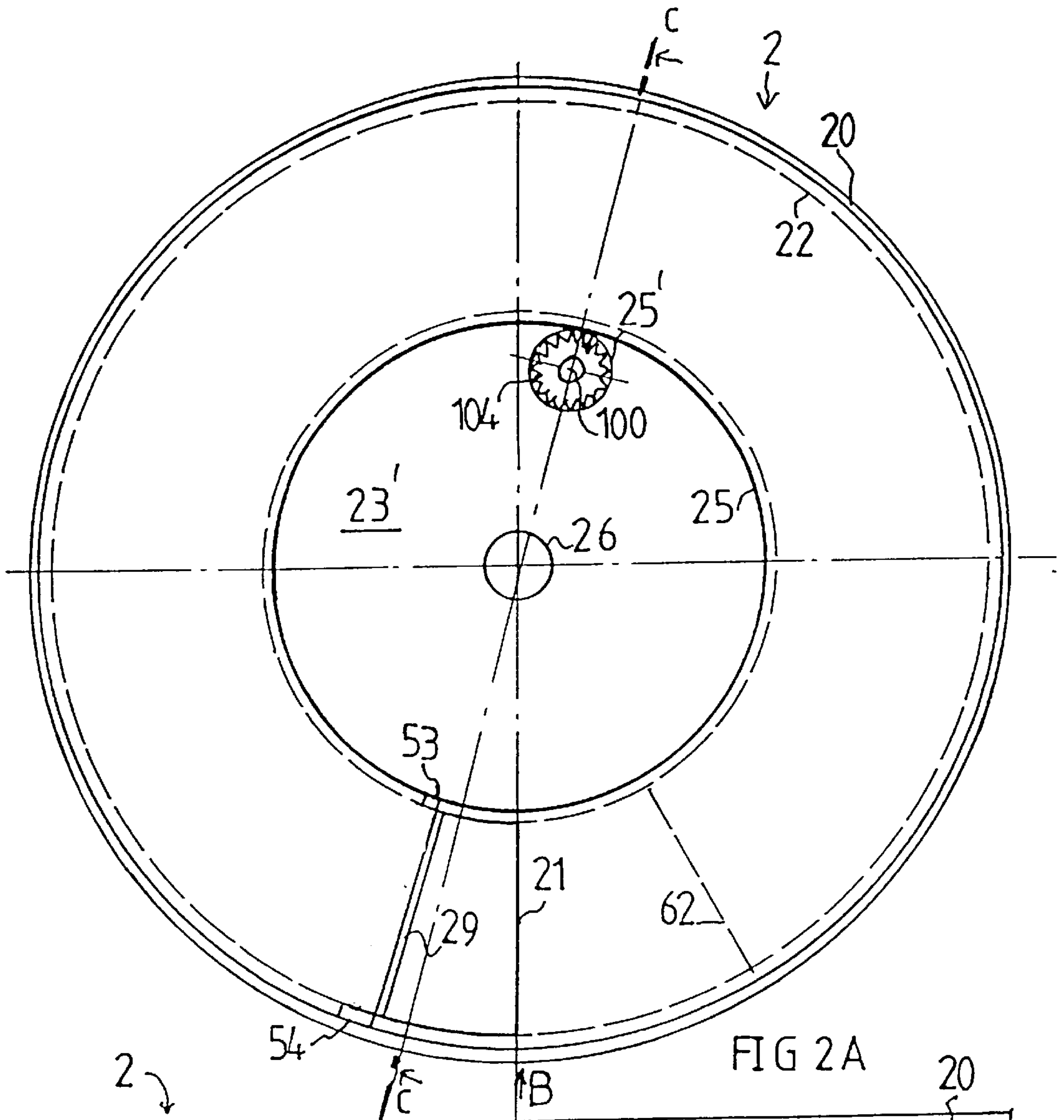
FIGS. 2A, 2B and 2C show, respectively from the top, from the side and in section view, an embodiment of a base of a distributor according to the present invention.
Figure 2B:
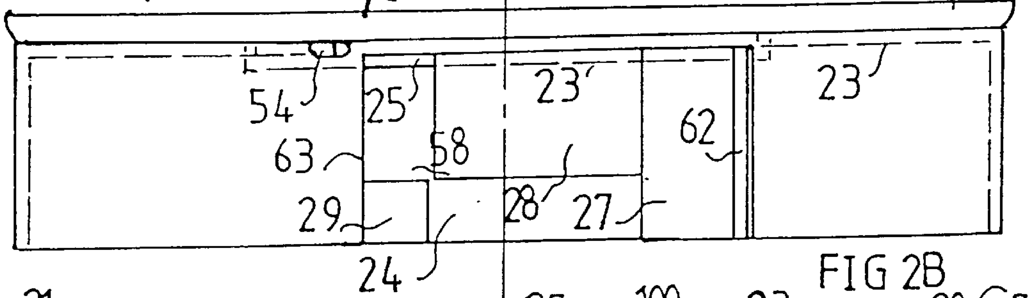
Figure 2C:
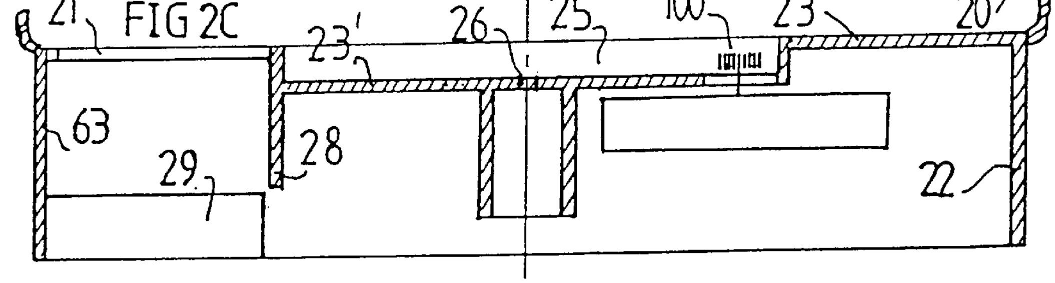

FIGS. 2A, 2B and 2C show an embodiment of base 2. FIG. 2A is a top view, FIG. 2B is a lateral view from arrow B in FIG. 2A. FIG. 2C is a section view along line C—C of FIG. 2A.

According to the invention, base 2 is comprised of a cylindrical crown 22 integrally open at its bottom face and closed by a disk 23 at its top. Window 21 is arranged in a peripheral portion of disk 23 and crown 22 has an access 63 to chamber 24 for distributing medication. Window 21 is of a size at least equal to the surface of the bottom opening of a box 41 of hopper 4 and the size of delivery access 63 substantially corresponds to the size of the frontal portion of chamber 24.

Chamber 24 is limited by 3 vertical walls 27, 28 and 29. Walls 27 and 29 are, preferably, straight and, for example, each aligned with a radius of disk 23. They laterally limit the delivery chamber. Wall 28 is, preferably, circular and aligned with a shoulder 25 and limits the wall of the delivery chamber opposite access 63. Preferably, one of the walls, for example lateral wall 29, is only partial and allows, in particular, the internal volume of base 2 to be ventilated.

In its central portion, disk 23 has a recess 23' limited by the circular shoulder 25 defining a housing for a rotation drive transmission element of hopper 4, which will be described later with FIGS. 10. An axial opening 26 is arranged at the center of recess 23' to let through the mounting member 11.

Preferably, an opening 24' of small diameter, arranged in recess 23' near its periphery, lets through a drive wheel 100 for the transmission element (not shown in FIGS. 2) and moved by a motor 13 placed inside the volume defined by base 2. Preferably, motor 13 is a stepper motor, for example a clock motor.

In an optional embodiment such as shown in FIGS. 2, base 2 moreover has a peripheral lip 20 extending towards hopper 4. The role of this lip 20 is, in particular, to protect the interface between base 2 and hopper 4 against the introduction of small objects which would hinder the rotation.

Figure 3A:
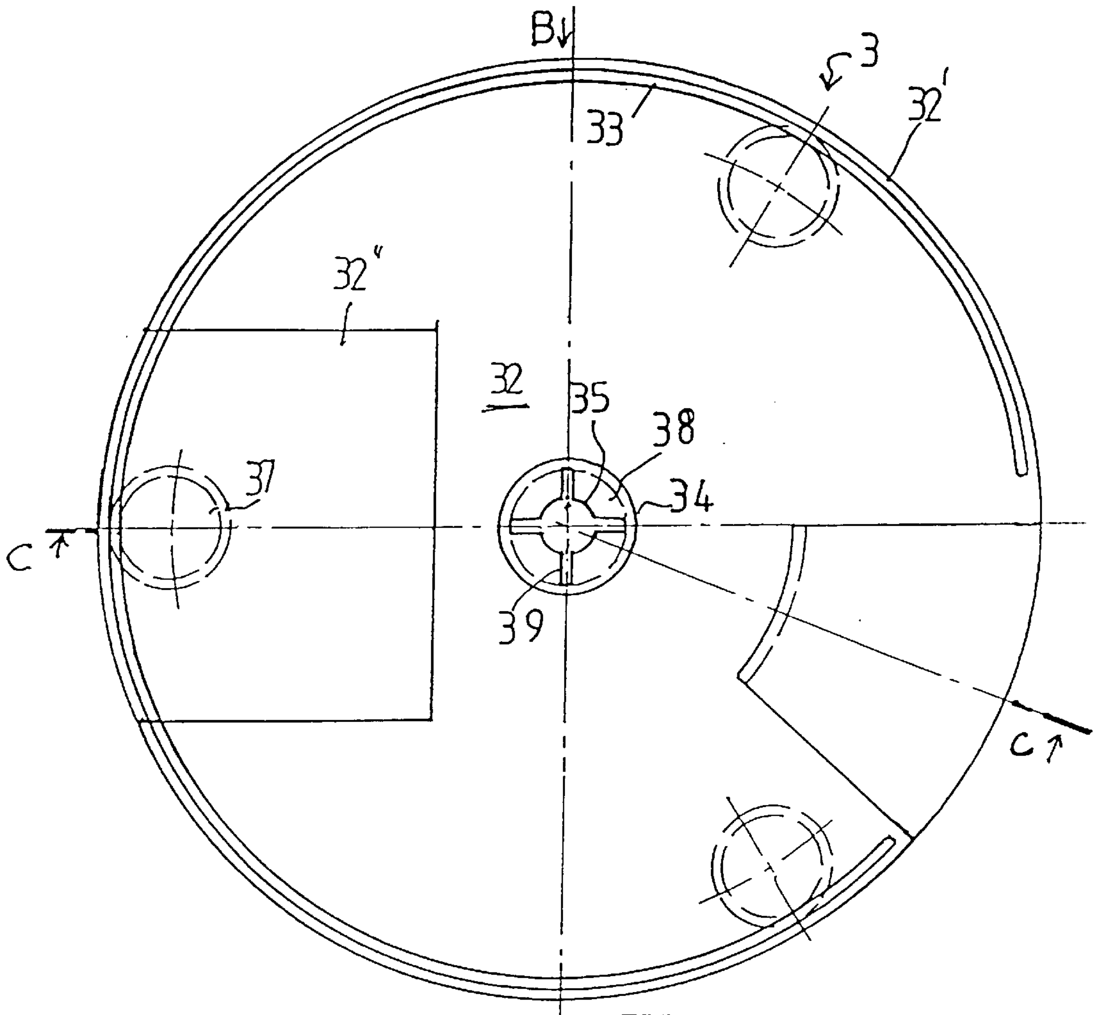
FIGS. 3A, 3B and 3C show, respectively from the top, from the side and in section view, an embodiment of a seat of a distributor according to the present invention.
Figure 3B:
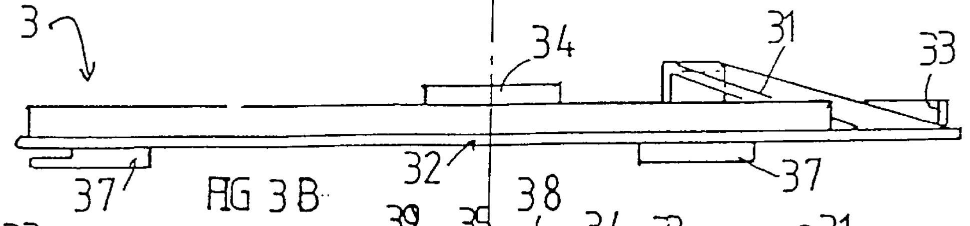
Figure 3C:
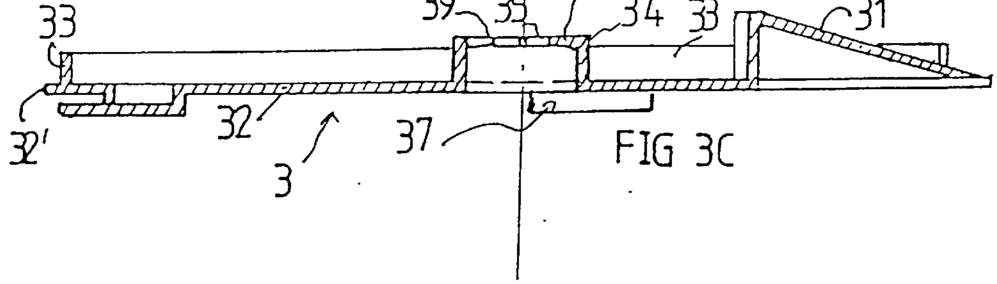

FIGS. 3A, 3B and 3C show an embodiment of seat 3 designed to close the bottom of base 2. In the embodiment shown in the figures, seat 3 and base 2 are realized as separate parts. However, it may be devised to realize these 2 elements as a single part. FIG. 3A is a top view of seat 3. FIG. 3B is a lateral view from arrow B of FIG. 3A. FIG. 3C is a section view along line C—C of FIG. 3A.

Seat 3 is comprised of a disk 32 defining the bottom of the distributor according to the invention. This disk is covered, near its periphery, by a crown 33 having an external diameter slightly smaller than the internal diameter of crown 22 of base 2 in order to insure a relative positioning of these 2 elements when mounting. A peripheral shoulder 32', external to crown 33, is adapted to receive the edge of crown 22 of the base.

Crown 33 is, like crown 22, open at the level of the medication delivery region, i.e. in register with the access 63 of crown 22. A ramp 31 extending from the periphery of disk 32 up to wall 26 of base 2 defines the bottom of the delivery chamber 24. The size of the ramp 31 corresponds to the space comprised between walls 27, 28 and 29 of base 2.

In its central portion, disk 32 has a cylindrical extension 34 of small diameter and directed towards base 2. An opening 35 coaxial to the opening 26 of base 2 and letting through the assembly member 11, is arranged at the center of extension 34. At the bottom of seat 3, the recess defined by cylindrical element 34 constitutes a housing 36 for a locking element of the assembly member which will be described hereinafter in relation with FIG. 12.

Several bumps 27 of the bottom face of disk 32 are regularly spaced about its surface for constituting the feet of the distributor according to the invention.

Disk 32 has, preferably, a door 32" for accessing a recess (not shown) for housing a battery of the motor. For example, door 32" is at the level of foot 37 which then serves as a grip.

Figures 4A, 4B, 4C:
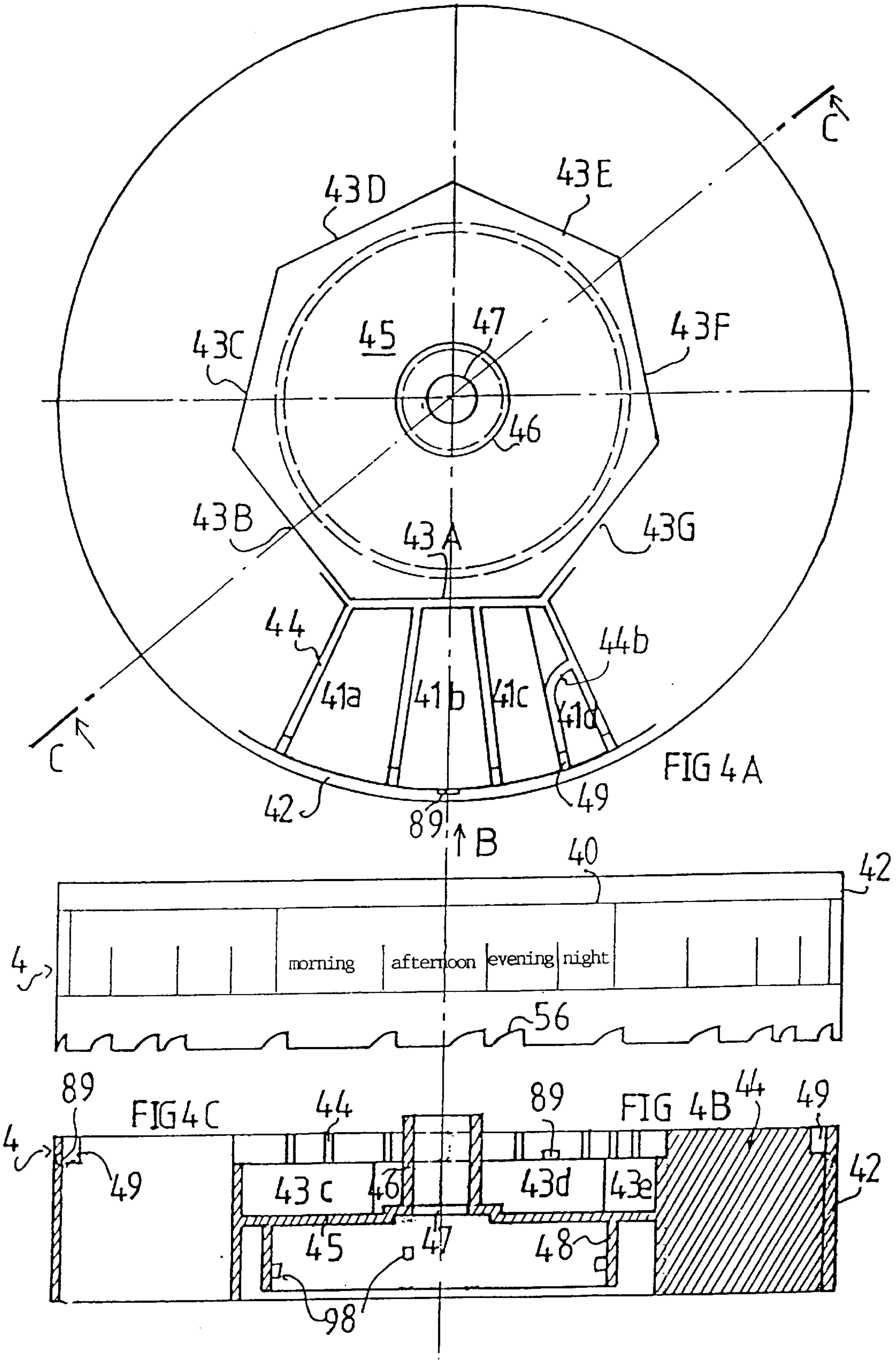
FIGS. 4A, 4B and 4C show, respectively from the top, from the side and in section view, an embodiment of a hopper for a medication distributor according to the present invention.

FIGS. 4A, 4B and 4C show an embodiment of a hopper for storing medication of a distributor according to the invention. FIG. 4A is a top view. FIG. 4B is a lateral view from arrow B of FIG. 4A. FIG. 4C is a section view along line C—C of FIG. 4A.

Hopper 4 is comprised of a cylindrical element within which are defined boxes 41 for storing medication to take, regularly distributed near the periphery of the hopper.

In the embodiment shown in FIGS. 4, each box 41 is limited by vertical walls and is open at both sides of the cylindrical element for allowing its filling through the upper face of hopper 4 and, through the bottom face of the hopper, the delivery of a dose corresponding to a medication intake when the box is in register with window 21 of base 2.

A first wall of each box is defined by a portion of a cylindrical crown 42 defining the external periphery of hopper 4. A second wall of boxes 41A, 41B, 41C is defined by an internal crown 43 coaxial to crown 42. Walls 44, distributed substantially radially between crowns 42 and 43, define the lateral walls of the boxes.

In the shown embodiment, the boxes 41 are distributed by sectors each corresponding to a day of the week. Each sector comprises 3 boxes 41A, 41B and 41C corresponding respectively to the medication intakes of the morning, the afternoon, and the evening and, in the embodiment shown in FIGS. 4, wall 44 separating two adjacent sectors is divided in two branches 44*a* and 44*b* near crown 42 for defining an additional box 41*b* of reduced size intended to contain medication of a night intake, most often a tranquilizer or a sleeping pill. As an alternative, this reduced size box may be defined by a complete separation wall between crowns 42 and 43.

In the shown example, crown 43 has a heptagon shape distributing the boxes 41 in seven sectors, each side 43*a* to 43*g* of polygon 43 being associated to a day of the week. It will however be remarked that this is a particular implementation example and that crown 43 may have any other polygonal or circular shape.

In the shown example, the height of crown 43 is smaller than that of crown 42 and its top edge is intended to receive a flange 81 of cover 8 which will be described in relation with FIGS. 8. As an alternative flange 81 fits inside crown 43 whose height is then, preferably, greater than that of crown 42.

The interior of crown 42 is closed, substantially at half of its height, by a plate 45 having, at its center, a cylindrical extension 46 directed towards cover 8 and at the center of which is arranged an opening 47 for letting through the assembly member 11. Extending from its bottom face, plate 45 has a crown 48, extending towards base 2 and having a diameter smaller than the diameter in which crown 43 is inscribed. Crown 48 defines a recess for a clutch element 9 adapted to transmit, to hopper 4, the rotation movement of element 10 housed in base 2, such as it will be described later in relation with FIGS. 9 and 10.

Each wall 44 has, at its upper portion and near crown 42, a slot 49 in which the end of a cover element (82 in FIG. 8) may engage, the cover being associated to a corresponding sector as will be seen later.

The external surface of crown 42 preferably bears indications identifying the dose being delivered. For example, a band 40 is stuck to the periphery of crown 42 and carries characters identifying the day of the week (M, T . . . S) and the time of the day (morning, afternoon, evening, night) of the corresponding medication intake.

If necessary, band 40 may extend beyond the bottom face of hopper 42 for replacing lip 20 of base 2. Band 40 is then realized in a material (for example polycarbonate) sufficiently rigid for ensuring the function otherwise insured by lip 20.

A feature of the present invention is that the opening 21 of base 2 (FIGS. 2) is associated to a closing element 5, 5' (FIGS. 5 and 6) the actuating of which is automatically controlled by the rotation of hopper 4 with respect to base 2.

Figure 5A:
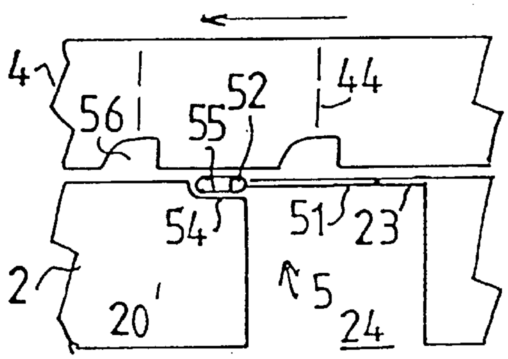
FIGS. 5A and 5B schematically show, respectively in an open position and in a closed position, a first embodiment of a closing element for a medication delivery window of a distributor according to the present invention.
Figure 5B:
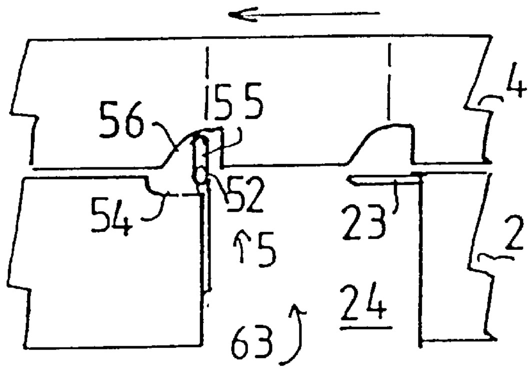
Figure 6:
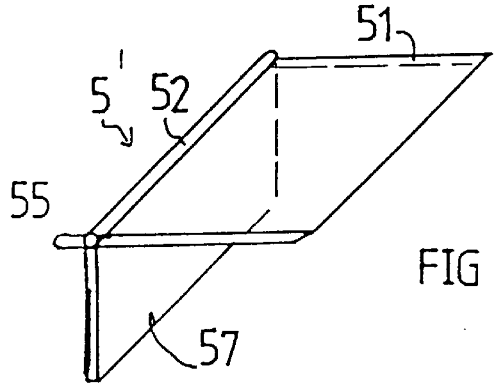
FIG. 6 shows, in perspective view, a second and preferred embodiment of a closing element for a medication delivery window of a distributor according to the present invention.

FIGS. 5A and 5B show, respectively in closed and open positions, a first embodiment of a closing element 5, in its cooperation position with base 2 and hopper 4, partially shown. FIG. 6 shows a second embodiment of a closing element 5' according to the invention.

Preferably, element 5 or 5' is comprised of at least a first plate 51 constituting a trap and having an edge carried by an axis 52 intended to be housed in base 2 near disk 23 and substantially in register with wall 29 limiting the delivery chamber 24. Preferably, axis 52 is substantially radially oriented in base 2. For example, shoulder 25 and crown 22 each comprise a recess 33, 34 intended to receive an end of axis 32. Trap 31 is intended to pivot between two positions, respectively, an open position in which it is substantially vertical (FIG. 5B) and abuts against wall 29, and a closed position in which it is substantially horizontal (FIG. 5A) and abuts against the bottom face of disk 23 to close opening 21. The height of base 2 is such that trap 51 is contained therein, whichever its position.

Preferably, trap 51 is controlled by a cam 55 carried, for example, by an end of axis 52 and is directed in a direction substantially diametrically opposed to trap 51. Cam 55 is intended to cooperate with notches 56 arranged in the bottom portion of crown 42 of hopper 4 and whose respective positions determine the opening times of trap 51 during the clockwise rotation of hopper 4 (symbolized in FIGS. 5A and 5B by arrows F). When trap 51 is in its closed position, cam 55 is housed in a corresponding notch of base 2, for example the recess 54 for an end of axis 52.

As an alternative, notches 56 of hopper 4 may be arranged in crown 43 which will then be circular. However, it will be preferred to fix the opening times of trap 51 by notches 56 arranged in crown 42, because this will make the distributor more accurate due to the difference between the respective diameters of crowns 42 and 43. This also allows to provide, for a given size of cam 55, a large number of notches 56, thus a greater number of opening times.

It will be remarked that notches 54 and 56 do not necessarily go through crowns 22 and 42. However, making them go through the crowns is not impairing, and once the distributor is assembled, notches 56 are masked by the edge 20 of base 2.

It will also be remarked that window 21 may, if necessary and as shown in FIG. 2A, extend beyond wall 29 in the rotation direction, which facilitates the mounting of axis 52 of the trap. The presence of this extension of window 21 does not hinder the delivery since, when a box 41 passes over this extension, the medication it contained has already been delivered. However, it will be preferred to limit the size of the portion of window 21 extending beyond the wall 29 in the rotation direction to the space necessary for mounting axis 52, in order to facilitate the filling of the distributor by avoiding medication from falling into the base while filling the box which is in register with this portion.

FIG. 6 shows a second and preferred embodiment of a closing element 5'. A feature of this embodiment is to provide, for element 5', an unstable rest position when a box 41 is in a delivery position. For this purpose, element 5' comprises a counterweight to plate 51 constituting the closing trap.

Thus, element 5' shown in FIG. 6 has a second plate 57 at an angle of approximately 90° to plate 51. This plate 57 pivots in base 2, outside delivery chamber 24, and masks the opening 58 (FIG. 2B) subsisting between wall 29 and disk 23 when trap 51 is in its closed position. Plate 57 facilitates the return of trap 51 in its closed position by creating a counterweight to trap 51. According to an other embodiment, not shown, the closing of trap 51 may be assisted by a spring.

However, preferably, plates 51 and 57 are sized so that they are in an unstable rest position about the direction of axis 52 when axis 52 is not solicited by cam 55. Thus, the presence of a medication in box 41 in register with window 21 is sufficient to make element 5' trip into its opening position. Moreover, once the medication has fallen, element 5' comes back into its unstable rest position. Thus, the actuation operated by cam 55 is a blocking or a freeing of the trap instead of an urged operation. As a consequence, the force necessary for controlling element 5' is minimized. The only power provided by the drive means is that related to the blocking of cam 55 at the end of notch 56. Yet, here again, the force necessary is minimized since element 5' leaves an unstable rest position. Preferably, plates 51 and 57 are sized so that a weight in the order of 0.3 g, chosen to correspond to the minimum weight of a medication to deliver, is sufficient to lower plate 51 so that the medication may fall.

Although the embodiments disclosed in relation with FIGS. 5 and 6 constitute preferred embodiments because of their simplicity, other control means for actuating the closing element may be provided. For example, the closing element may be comprised of a plate pivoting about a vertical axis while staying parallel with disk 23 and movable between two positions, the plate always being contained within the base. The control of such a plate may also be realized by the rotation of the hopper. For example, elements extending from its bottom each act in turn on a lever (a beak coplanar with the plate) for controlling the rotation of the plate. When one of the elements having caused the opening escapes from the control lever, the plate closes window 21 again, for example, through a pullback spring.

An advantage of the present invention is that, due to the use of a trap controlled by the rotation of the hopper, any premature delivery of medication is avoided.

Another advantage of the present invention is that the control of the closing trap of window 21 is particularly simple and does not need any mechanical means.

Another advantage of the present invention is that, due to the use of this closing trap, the size of window 21 does not have to be strictly adapted to the opening of the boxes of hopper 4. Thus, a same base 2 (and a same seat 3) may be associated to hoppers which are different with respect to the distribution and the size of the boxes they contain.

Another advantage of the present invention, especially of the preferred embodiment of the closing element illustrated in FIG. 6, is that it is particularly well adapted to a battery powering of its drive means, thanks to a very low power required for controlling the closing element.

Another advantage of the embodiment of FIG. 6 is that it increases the reliability of the distributor. Indeed, the fact that the efforts on the cam are minimized, also minimizes friction.

If, in a preferred embodiment, the locations of notches 56 are fixed when manufacturing the hopper, it will however be possible to provide the user with the possibility to close certain notches 56. For example, each notch is associated with a plate of suitable size and one provides, either means to removably hold the plates in the notches, or individual articulation means for each plate between a position where the plate covers the notch and a position where the plate is turned against crown 42. In this case, lip 20 of base 2 will be omitted to give access to these plates.

Figure 7A:
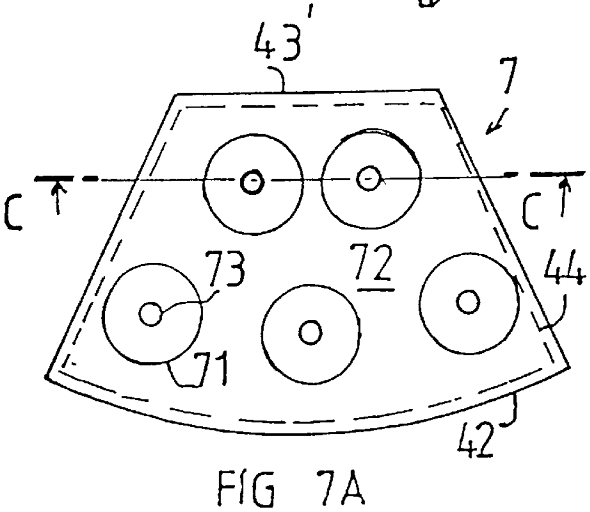
FIGS. 7A, 7B and 7C partially show, respectively from the top, from the side and in section view, an alternative hopper for a distributor according to the present invention.
Figure 7C:
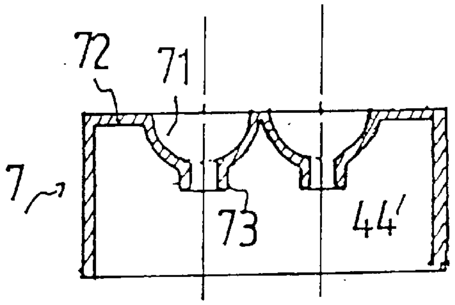
Figure 7B:
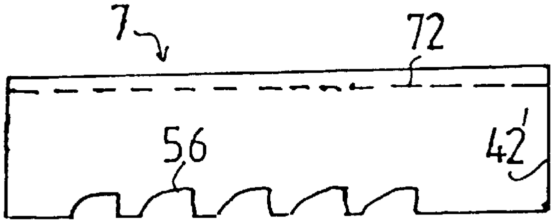

FIGS. 7A, 7B and 7C illustrate an alternative embodiment of the boxes of a hopper according to the present invention. FIG. 7A is a top view of a sector 7 of a hopper according to this alternative. FIG. 7B is a lateral view from arrow B of FIG. 7A. FIG. 7C is a section view according to line C—C of FIG. 7A.

According to this alternative, each box intended to contain a medication dose is comprised of a pot 71 arranged as an indentation of the surface of a disk 72 constituting the surface of the hopper. Each pot 71 has, at its bottom, an opening 73 from which the medication falls into chamber 24 (not shown) when this opening 73 is in register with window 21 of base 2 and when the opening of trap 51 is caused by the passing of cam 55 before a corresponding notch 56 of crown 42' of the hopper. If necessary, the hopper is reinforced by vertical walls 44' (FIG. 7C) limiting the different sectors 7. The respective locations of openings 73 and of notches 56 are such that a single pot 71 which has not been delivered is in register with window 21. The fact that the openings 73 of pot 71 located downstream the current pot in the rotation direction are also in register with window 21 is not impairing since the corresponding medication has already been delivered. This alternative embodiment of the hopper allows, for a given size of the distributor, to multiply the number of doses, since the pots 71 may be distributed as shown, in a staggered manner, near the periphery of the hopper. Such an alternative is, for example, appropriate for distributing homeopathic pills.

Figures 8A, 8B, 8C:
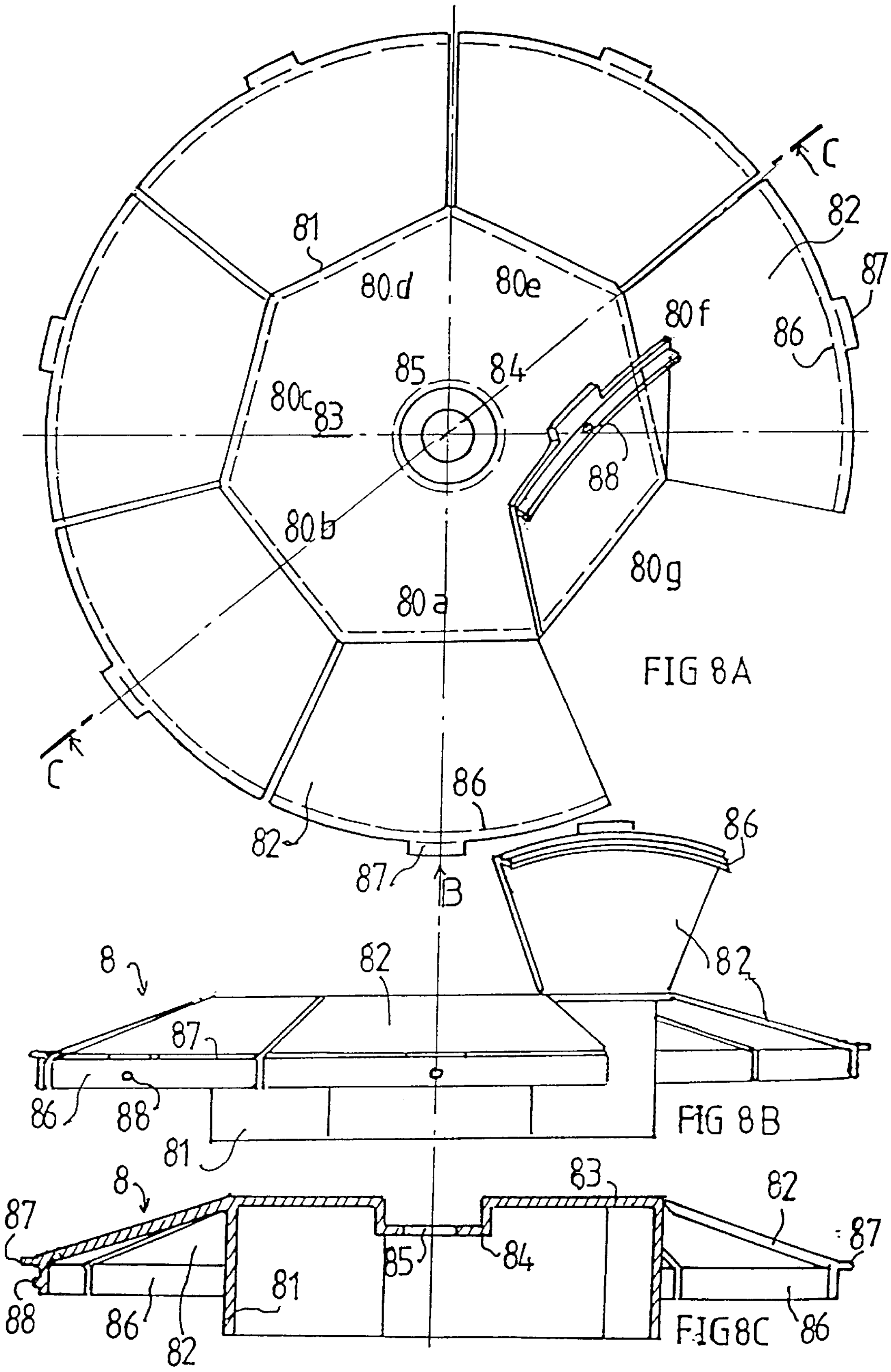
FIGS. 8A, 8B and 8C show, respectively from the top, from the side and in section view, an embodiment of a cover for a medication distributor according to the present invention.

FIGS. 8A, 8B and 8C show an embodiment of a cover 8 according to the present invention. FIG. 8A is a top view. FIG. 8B is a lateral view from arrow B of FIG. 8A. FIG. 8C is a section view according to line C—C of FIG. 8A.

According to the invention, cover 8 has a flat central portion 83 carried by a peripheral crown 81 serving as a flange and whose shape corresponds to the shape of crown 43 of hopper 4 on which crown 81 rests by its edge. The central portion 83 has, at its center, a recess 84 at the center of which is arranged an axial opening 85 letting through the mounting member 11. If crown 43 has a height greater than crown 42, its edge comes, preferably, in contact against the internal face of cover 8.

According to a preferred embodiment of cover 8, several covering elements 82 constituting independently openable traps are coupled by hinges 80*a* to 80*g* to the upper end of crown 81. An advantage which appears here of the polygonal shape of crown 81 is to have straight portions for the hinges. Thus, according to the present invention, the number of sides of the polygon constituting crown 81 of cover 8 and the crown 43 of hopper 4 correspond to the number of sectors of hopper 4 and, preferably, to the number of elements 82 of cover 8. The elements 82 are, preferably, realized in a single piece with portion 83 and crown 81, the hinges 80 being directly obtained by casting plastics.

According to the shown embodiment, the height of crown 81 is such that the covering elements 82 form together a convex crown whose periphery joins the edge of crown 42 of hopper 4. At its free end, each element 82 has, for example, a vertical wall 86 having the shape of a cylindrical portion of a diameter slightly smaller than the internal diameter of crown 82 of the hopper. The walls 86 are intended to engage in slots 89 of the walls 44 of hopper 42 when the cover element is closed. Each element 82 is associated with a manual operating means, for example, a bump 87 extending from the free end of element 82, preferably in its central portion. Preferably, each wall 86 has, extending from its external face, a bump 88 intended to cooperate with a recess 89 of the internal wall of crown 82 of hopper 4 for blocking the cover 82 in its closed position and avoid any undesired opening.

An advantage of the shape given to cover 8 of the medication distributor according to this embodiment is that the curvature of each element 82 associated to a straight hinge allows a cover element to maintain itself in its raised position.

Another advantage of the shape given to elements 82 is that it prevents the simultaneous opening of two adjacent cover traps. Thus, the respective medication doses are introduced by sectors (for example by days) in the hopper 4 and the error risk is minimized while filling the distributor.

As a not shown alternative, each element 82 may have, extending from its internal face, walls aligned with the walls 44 of the hopper. Any mixing of the doses is thus avoided even if the distributor is accidentally turned over. According to another alternative (not shown), this function of separating the boxes 41 near cover 8 is insured by extensions of walls 44 of hopper 4 whose respective edges are slanted for adapting to the slope of the cover elements 82.

Figure 9A:
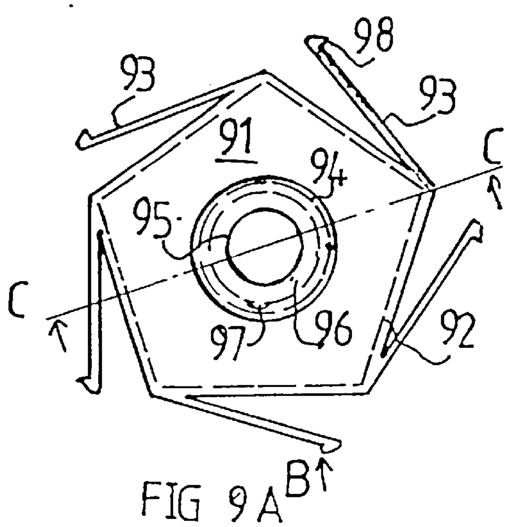
FIGS. 9A, 9B and 9C show, respectively from the top, from the side and in section view, an embodiment of a rotation drive element for a hopper of a medication distributor according to the present invention.
Figure 9B:
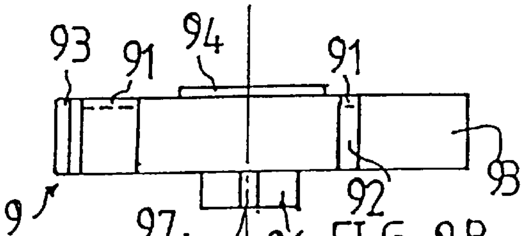
Figure 9C:
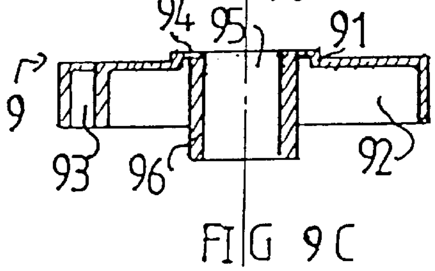

FIGS. 9A, 9B and 9C show a clutch element 9 intended to drive hopper 4 in rotation with respect to base 2. FIG. 9A is a top view. FIG. 9B is a lateral view from arrow B in FIG. 9A. FIG. 9C is a section view along line C—C of FIG. 9A.

Figure 10A:
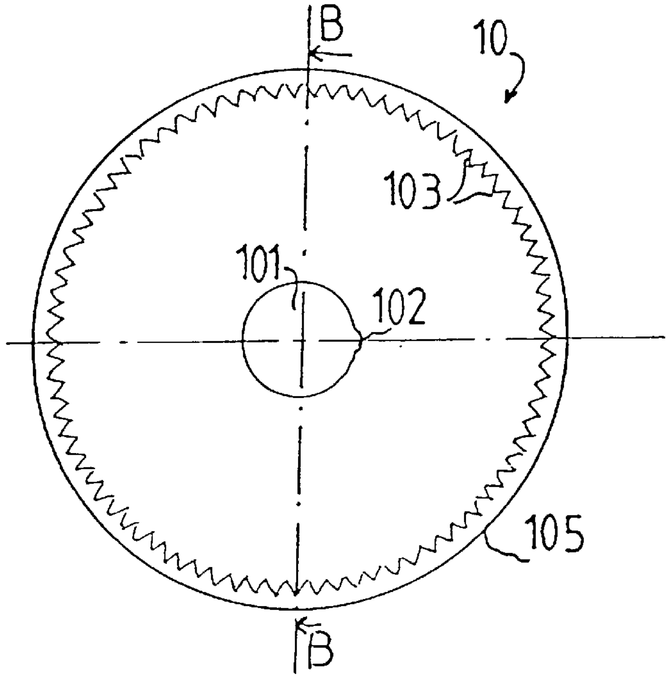
FIGS. 10A and 10B show, respectively from the top and in section view, an embodiment of a rotation drive transmission element for a hopper of a medication distributor according to the present invention.
Figure 10B:
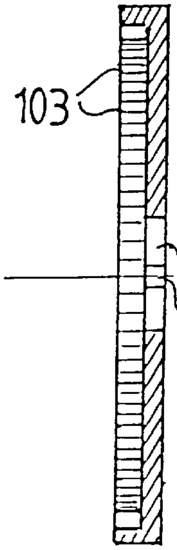

Clutch element 9 is designed to be inserted in the recess defined by crown 48 (FIG. 4C) of hopper 4 and to be driven by a pinion 10 shown in FIGS. 10A and 10B, in turn driven by a drive wheel 100 (FIG. 2A). FIG. 10A is a top view. FIG. 10B is a section view along line B—B of FIG. 10A.

Pinion 10 is designed to be housed in the recess 23' of disk 23 of base 2, defined by shoulder 25.

The clutch element 9 is, for example, comprised of a plate 91 carried by a peripheral crown 92 from which straight arms 93 extend. By their elasticity, arms 93 forcibly contact the internal wall of crown 48 of hopper 4 thus allowing its drive, for example clockwise, at the rotation speed of pinion 10.

A second role of the clutch element 9 is to avoid a reverse rotation of hopper 2 to prevent motor 13 or cam 55 from being damaged. For this purpose, the arms 93 are also designed to cooperate with teeth 98 (FIG. 4C) of the internal face of crown 48 to prevent any rotation movement in the direction opposite to that fixed by motor 13. At its free end, each arm 93 has, preferably, a stud 98 extending outwards for improving the blocking of the reverse rotation.

In the realization example shown in FIGS. 9, plate 91 and crown 92 have a polygonal shape (pentagonal) from each apex of which extends an arm 93. At its center, plate 91 has, in a portion 94 which is circular and extends towards hopper 4, an axial opening 95 letting through the assembly element 11. Portion 94 is designed to engage in the circular recess of the bottom face of plate 45, defined by portion 46 (FIG. 4C). A tube 96, coaxial to opening 95 and surrounding the latter, is arranged inside element 9. Tube 96 has a height greater than the height of crown 92 and is designed to be engaged in an axial opening 101 of pinion 10. Tube 96 has, at a location of its external periphery, a key 97 designed to cooperate with a vertical slot 102 of opening 101 for making element 9 and pinion 10 integral with each other in rotation.

It will be remarked that clutch element 9 allows a manual rotation of hopper 4 in the clockwise direction to set the distributor at the right time when it is used for the first time by placing the box 41 corresponding to the current dose in register with opening 21.

Pinion 10 is, preferably, a crown pinion 105 whose internal surface is provided with teeth 103 designed to cooperate with the teeth 104 of the drive wheel 100 (FIG. 2A). The number of teeth 103 at the internal periphery of crown 105 is adapted according to the number of teeth 104 of the drive wheel 100 and to the speed of motor 13, so that one turn of pinion 10 corresponds to the desired delivery cycle for the distributor. If necessary, other gears are provided between a shaft (not shown) of motor 113 and wheel 100.

As an alternative for the driving means, it is possible to provide a clutch element directly in mesh with the axis of a gear located in base 2 or to link the hopper 4 to this axis. However, an advantage in providing a removable transmission pinion (10) between base 2 and hopper 4 is that this reduces the number of parts dedicated to different versions of the distributor.

All the elements constituting the distributor device described hereabove are assembled, preferably, by means of an element 11 (FIG. 11) having a tubular portion 110 engaged successively through the openings 85 of cover 8, 47 of hopper 4, 95 of clutch element 9, 101 of gear pinion 10, 26 of base 2, and 35 of seat 3. Element 11 has, at a first top end, a handling button 111. A second end 112 of element 11 is designed to cooperate with a nut 12 (FIG. 12) for blocking the mounted assembly. For example, portion 110 is slit longitudinally (113) near the end 112 to offer an elasticity allowing its engagement and its blocking in nut 12. As an alternative, the blocking of the end 112 is achieved directly in the extension 34 of base 2. In this case, the top wall 38 of extension 34 has radial openings 39 giving it elasticity when element 11 is introduced.

It will be remarked that separation elements for the different components may be used for adapting the piling thereof. These elements will preferably be realized in a single piece with one of the components it is supposed to maintain at a distance from another component. Such separation elements assist the guiding of element 11 during the assembly of the distributor.

According to the invention, the medication intake times are programmed by the mechanical constitution of the hopper and not by an electrical programming based on a clock. The structure of the distributor is thereby considerably simplified. If necessary, the distributor is associated to a clock, but only for its alarm function in order to remind a patient of the medication intake times and this clock is independent of the movement of the hopper 4.

An advantage of the present invention is that the medication distributor is of a particularly simple constitution and has, except for motor 13, exclusively mechanical elements.

Another advantage of the present invention is that, except for motor 13, all the elements constituting the distributor may be obtained by plastics casting.

Another advantage of the present invention is that the constitution of hopper 4 allows the transfer, during rotation, of friction between hopper 4 and base 2 to minimal surfaces (the ends of crowns 43 and 42). This contributes to the optimization of the power necessary for the operation, as does the global horizontal position of the distributor which optimizes the effort distribution on the clutch element 9.

According to a particular embodiment, hopper 4 is in polyamid or aceton-buthyl-styrene (ABS), and base 2 is in polypropylene or in polyethylene. Such a material association promotes the sliding between the two elements one with respect to the other.

Preferably, cover 8 is in polypropylene or polyethylene, which allows to manufacture hinges 80 and elements 82 in one piece.

An advantage of the present invention is that it is particularly well adapted to a serial manufacturing of the elements constituting the distributor by minimizing the number of elements personalized according to the versions (periodicity of the delivery cycles). Indeed, only a gear pinion 10 conditions the duration of a rotation cycle of hopper 4 and only the constitution of hopper 4 (in particular the number and the positions of notches 56 of crown 42) conditions the medication delivery times. Thus, seat 3, base 2, element 9, assembly element 11, 12, and, if necessary, also cover 8 may be the same for several versions of the distributor.

It will however be remarked that the respective dimensions of these elements and the size of opening 21 of base 2 may be adapted according to the versions, in particular, for very different versions (in delivery periodicity and in filling cycle duration).

Of course, various alternatives and modification of the present invention will appear to those skilled in the art. In particular, the respective dimensions of the different elements constituting the distributor according to the invention may be adapted for example, according to the types of medication to deliver and/or according to the number of doses stored in the hopper. Moreover, other shapes than those indicated by way of example in the preceding description may be devised, provided that the described functionalities are respected.

Such alterations, modifications, and improvements are intended to be within the spirit and scope of the invention. Accordingly, the foregoing description is by way of example only and is not intended to be limiting. The invention is limited only as defined in the following claims and the equivalents thereto.

I claim:

1. An automatic medication distributor (1) comprising:

a hopper (4) of general cylindrical shape, having boxes (41) bounded by an outer periphery of the hopper, and provided with upper and lower openings transverse to the periphery of the hopper;

a fixed base (2) supporting the hopper and provided with a delivery window (21) that is transverse to an outer periphery of the base;

rotation drive means (13, 100, 10, 9) of the hopper with respect to the base to successively bring the lower transverse opening of each box in register with the delivery window; and a closing element (5,5) for the delivery window, that opens the delivery window upon rotation of the hopper when the lower transverse opening of one of the boxes is in registration with the window, the closing element (5') being associated to a rotation axis (52) housed in the base (2), and comprising a first plate (51) constituting a trap adapted to close the delivery window (21) and a second plate (57) approximately perpendicular to the first plate, the axis (52) being placed at the intersection of the two plates.

2. The distributor according to claim 1, wherein the fixed base (2), the hopper (4), and the rotation drive means (9, 10) are pilable and axially assembled through a straight element (1).

3. The distributor according to claim 1, wherein the base (2) contains a motor (13) for rotating a transmission element (10) associated to the base (2), the transmission element being adapted to be rotation linked to a drive element (9) of the hopper (4), housed in the hopper.

4. The distributor according to claim 3, comprised of elements (2, 3, 4, 8, 9, 10) which are pilable and axially assembled through a straight element (11).

5. The distributor according to claim 1, wherein the hopper (4) has a bottom face with notches (56), and further comprising a cam (55) that cooperates with the notches (56) to actuate the closing element (5') at predetermined positions of the hopper (4) with respect to the base (2).

6. The distributor according to claim 5, wherein said plates (51, 57) are sized so that the closing element (5') is in an unstable rotation rest position when cam (55) is in a notch (56).

7. The distributor according to claim 4, wherein the plates (51, 57) are sized so that a weight in the order of 0.3 g is sufficient to cause the tripping of the first plate (51) towards an opening position.

8. The distributor according to claim 7, wherein the hopper (4) is associated with a cover (8) provided with several covering elements (82) for the boxes (41), each element (82) being associated to at least one box (41) and being connected through a hinge (80) to a central portion (81, 83) of the cover (8).

9. The distributor according to claim 1, wherein the hopper (4) is associated with a cover (8) provided with several covering elements (82) for the boxes (41), each element (82) being associated to at least one box (41) and being connected through a hinge (80) to a central portion (81, 83) of the cover (8).

10. The distributor according to claim 9, wherein the hopper (4) comprises two concentric crowns (42, 43) connected together by walls (44) defining the boxes (41), a first crown (43) of a smaller diameter having a polygonal shape.

11. The distributor according to claim 9, wherein the hopper (4) comprises two concentric crowns (42, 43) connected together by walls (44) defining the boxes (41), a first crown (43) of a smaller diameter having a polygonal shape.

12. The distributor according to claim 11, wherein the number of sides of the polygon defining the first crown (43) of the hopper corresponds to the number of covering elements (82) of the cover (8).

13. The distributor according to claim 11, wherein the number of sides of the polygon defining the first crown (43) of the hopper corresponds to the number of covering elements (82) of the cover (8).

14. The distributor according to claim 13, wherein the base (2) contains a motor (13) for rotating a transmission element (10) associated to the base (2), the transmission element being adapted to be rotation linked to a drive element (9) of the hopper (4), housed in the hopper.

* * * * *